Feb. 23, 1965   J. M. DOBOVAN   3,170,452
VALVE SEAT
Filed June 28, 1961
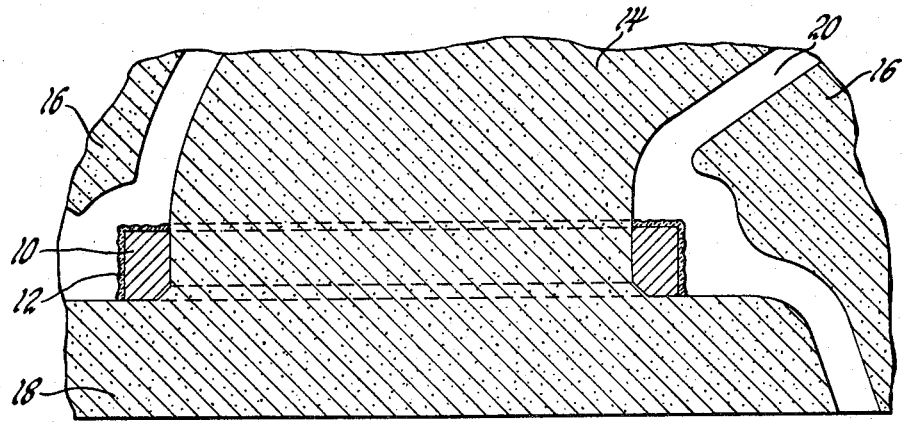
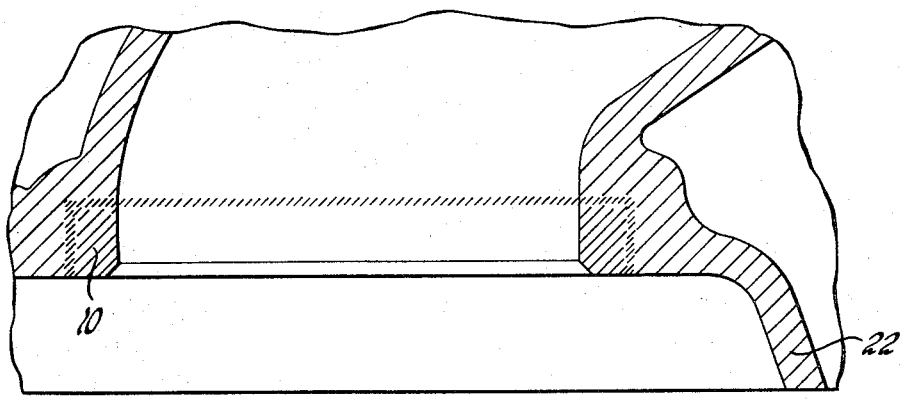
INVENTOR.
John M. Dobovan
BY
Peter P. Kozak
ATTORNEY

United States Patent Office 3,170,452
Patented Feb. 23, 1965

3,170,452
VALVE SEAT
John M. Dobovan, Mount Clemens, Mich., assignor to General Motors Corporation, Detroit, Mich., a corporation of Delaware
Filed June 28, 1961, Ser. No. 120,362
8 Claims. (Cl. 123—188)

This invention relates to internal combustion engines and more particularly to a wear-resistant alloy poppet valve seat associated with cast iron cylinder heads.

The cylinder blocks and heads of interal combustion engines for use in passenger vehicles are generally made of a low alloy or unalloyed-grade cast iron either in the as-cast or stress relieved state because of its relatively good frictional properties and wear resistance as well as its good machinability and relatively low cost. The valve seats are generally produced by merely machining the soft grey cast iron of the cylinder head. On the other hand, in engine equipment for use in heavy duty trucks it is conventional to cast the cylinder blocks and heads of an alloy of grey cast iron. However, due to the rapid wear of the exhaust valve seats in such heavy duty engines, it is highly desirable to provide these cylinder blocks or heads with valve seats of greater wear resistance. This is generally accomplished by providing these engine parts with a separate seat insert of hardened cast iron or suitable wear-resistant alloy. To this end, a suitable recess or counterbore is provided in the cylinder head in the region of the valve seat for receiving the separately formed valve seat insert. In the conventional practice the valve seat is press-fitted or shrunk-in in the counterbore. Because of the absence of a metallurgical bond in constructions of this type the valve seat inserts operate at a substantially higher temperature than valve seats of the cast iron engines which do not employ valve seat inserts. As a consequence, although the former are more desirable than the latter, valve seat inserts of the former must still be reground periodically although at longer intervals than the cast iron seats.

The dissipation of heat from the seat of the exhaust valve of an internal combustion engine therefore presents a problem which strongly affects the life of the valve seat. The joint between the cylinder head and the press or shrunk-fitted valve seat provides a space therebetween which, although exceedingly small, nevertheless causes a heat dam between the valve seat and the adjacent cylinder head so that the heat conduction from the valve seat to the cylinder head is retarded.

It is an object of this invention to provide an internal combustion engine cylinder head construction in which a wear-resistant alloy valve seat insert is associated with a cast iron cylinder head by means of a metallurgical bond and whereby a direct heat conducting path is provided between the valve seat and the cylinder head and accordingly the heat dam between the insert and the cylinder head which occurs in the prior art is avoided and the life of the valve seat is improved substantially. It is a further object of this invention to provide a method of associating an alloy insert with a cast iron cylinder head whereby a metallurgical joint is provided between the alloy insert and the cylinder head to thereby eliminate any heat dam.

In general these and other objects are accomplished by forming a valve seat insert of a suitable wear-resistant alloy, then coating the portions of the insert which are to engage the cylinder head with a nickel brazing alloy containing relatively small proportions of silicon and boron and then casting the cylinder head about the thusly coated insert whereby a metallurgical bond is provided between the alloy iron insert and the cast iron of the cylinder block.

Other objects and advantages of this invention will more fully appear from the following detailed description thereof, reference being made to the accompanying drawings, in which:

FIGURE 1 is a cross-sectional view of a valve seat insert having a brazing alloy coating thereon;

FIGURE 2 is a fragmentary elevation cross-sectional view of a sand mold having the insert of FIGURE 1 positioned in the cavity thereof preparatory to casting the cylinder head thereabout in accordance with the invention; and FIGURE 3 is a fragmentary cross-sectional view of a cylinder head formed in accordance with this invention as a consequence of pouring cast iron into the mold shown in FIGURE 2.

As briefly indicated above, this invention is concerned with the manufacture of a cylinder head or the like having a poppet valve seat insert which is metallurgically bonded to the cast iron of the cylinder head. In general, this is accomplished by a method in which the valve seat insert is coated with a suitable brazing alloy and the ferrous cylinder head is cast against the insert.

In the preferred embodiment of the invention, a valve seat insert 10 is first cast such as is shown in FIGURE 1 of the drawings. An alloy is selected for the inserts which has suitable wear-resistant properties and which preferably has a coefficient of thermal expansion similar to that of grey cast iron of which the cylinder head is to be cast. Satisfactory valve seat inserts may be cast of ferrous base alloys such as the following:

*Example I.—Silcrome #1 alloy*

|  | Percent |
|---|---|
| Carbon | 0.5 |
| Manganese | 0.60 |
| Silicon | 3.00 |
| Chromium | 9.00 |
| Iron | Balance |

*Example II.—Silcrome #XB*

| Carbon | 0.8 |
|---|---|
| Manganese | 0.6 |
| Silicon | 2.0 |
| Chromium | 21.00 |
| Nickel | 1.60 |
| Iron | Balance |

*Example III.—Type 416 stainless*

| Carbon | 0.15% max. |
|---|---|
| Manganese | 1.25% max. |
| Silicon | 1.0% max. |
| Chromium | 12% to 14%. |
| Nickel | 0.5% max. |
| Iron | Balance. |

These alloys are satisfactorily wear and corrosion-resistant and are readily machinable.

After the insert 10 has been formed, it is cleaned preferably by means of a suitable cleaning solution and by grid blasting. Any well known degreasing or cleaning method such as by means of an electrolytic caustic solution or vapor degreasing, may be used. The portions of the insert which are to lie adjacent the cast iron of the cylinder head are then coated with a layer 12, preferably of a thickness in the vicinity of about 1/16 of an inch, of a nickel base brazing alloy containing relatively small quantities of silicon and boron. A specific composition of a suitable brazing alloy for this purpose is one consisting of 93.3% nickel, 3.5% silicon and 1.9% boron. The brazing alloy layer 12 is conveniently applied by means of a conventional metal spray gun.

After the valve seat insert has been coated with the brazing alloy, it is next positioned within a mold suitable for casting cylinder heads as illustrated in FIGURE 2 at substantially room temperatures. As shown, the mold may consist of a dry sand core 14, dry sand water jacket cores 16 and a green sand mold 18 which together define the valve seat portion 20 of a typical water-cooled internal combustion engine cylinder head.

After the insert 10 has been positioned in the mold as above described, molten cast iron is poured into the mold cavity 20 in a conventional manner. During the course of the casting process the alloy layer 12 is melted to effect a clean metallurgical bond between the insert 10 and the poured cast iron 22 as illustrated in FIGURE 3.

The valve inserts of the present invention are formed of a wear and heat-resistant alloy preferably having a coefficient of thermal expansion substantially the same as that of the cast iron which are in effect formed integrally with the cast iron. Improved or longer valve seat life is achieved because of the greatly improved heat conduction into the iron through the molecular bond provided between the inserts and the cast head. As a result of the improved valve seat life and better engine performance obtained by the valve seats of this invention, the need for valve seat grinding is almost entirely eliminated.

The preferred valve seat insert alloys mentioned above all contain substantial amounts of chromium. The chromium of these alloys tends to form massive hard and brittle carbides by solution when the molten cast iron comes into contact with the insert in the casting operations. The brazing alloy layer 12 which is sandwiched between the alloy insert 10 and the cylinder body 22 prevents the formation of massive carbides in the cast iron since the molten iron is not permitted to come into direct contact with the metal of the alloy insert and therefore cannot dissolve the carbide promoting chromium. The cylinder heads produced in accordance with this invention are of higher quality and are produced with greater economy than the presently used pressed-in or shrink-fitted insert assemblies. The valve seat inserts require no machining prior to being cast in and the bonding layer 12 is simply applied by spraying directly onto clean grit blasted as-cast inserts.

Another brazing alloy which may satisfactorily serve as the layer 12 is one consisting of 91.3% nickel, 4.5% silicon and 2.9% boron. Alloys containing from about 90% to 95% nickel, about 3% to 5% silicon and about 1.5% to 3.5% boron provide satisfactory bonds between the insert and cylinder head. Low silicon-nickel alloys containing about 97% nickel and 3% silicon have also been found satisfactory. Brazing alloys consisting of nickel and 1% to 3% boron are also satisfactory. Other nickel alloys such as Silicon-Monel containing about 0.5% to 4% silicon, 30% copper, 2% iron and the balance nickel may in some instances also be used. These alloys fuse readily with cast iron.

While the embodiment described herein constitutes a preferred form, it is to be understood that the scope of the invention is not limited thereby except as defined in the following claims.

I claim:

1. A poppet valve seat construction for internal combustion engines and the like comprising a cast iron body and a valve seat insert metallurgically joined to said body, said insert being a wear resistant ferrous metal alloy different than said body and containing substantial amounts of chromium, said insert being metallurgically joined to said body through a nickel base brazing alloy including small amounts of an element taken from the group consisting of boron and silicon.

2. An internal combustion engine cylinder head or the like comprising a cast iron body and including a poppet valve seat, said seat being formed of a wear-resistant ferrous alloy which is different than said cast iron body and including substantial amounts of chromium, said seat being metallurgically joined to said cast iron through a nickel base brazing alloy including small amounts of boron and silicon.

3. An internal combustion engine cylinder head comprising a cast iron body and including a poppet valve seat, said seat being formed of a wear-resistant ferrous alloy different than said cast iron body and including substantial amounts of chromium, said insert being metallurgically joined to said cast iron through a nickel base brazing alloy including 90% to 95% nickel, about 1.5% to 3.5% boron, about 3.0% to 5.0% silicon and the balance impurities.

4. A method of forming a cast iron cylinder head or the like comprising the steps of forming a valve seat insert of a wear-resistant ferrous metal alloy different than said cast iron and including substantial amounts of chromium, cleaning the surfaces of said insert, applying a layer of a nickel base brazing alloy including small amounts of an element from the group consisting of boron and silicon over portions of said insert, casting molten cast iron against said coating and permitting said cast iron to cool whereby a metallurgical bond is formed between said insert and said cast iron.

5. A method of forming a cast iron cylinder head or the like comprising the steps of forming a valve seat insert of a wear-resistant alloy different than said cast iron and including substantial amounts of chromium, cleaning the surfaces of said insert, spraying a layer of a nickel base alloy including small amounts of boron and silicon over portions of said insert, casting molten cast iron against said coating and permitting said cast iron to cool whereby a metallurgical bond is formed between said insert and said cast iron.

6. A method of forming a cast iron cylinder head or the like comprising the steps of forming a valve seat insert of a wear-resistant ferrous metal alloy different than said cast iron and including substantial amounts of chromium, cleaning the surfaces of said insert, applying a layer of a brazing alloy consisting essentially of about 90% to 95% nickel, 1.5% to 3.5% boron, 3% to 5% silicon and the balance impurities over portions of said insert, casting molten cast iron against said coating and permitting said cast iron to cool whereby a metallurgical bond is formed between said insert and said cast iron.

7. A cast iron article including an insert cast therein, said insert being formed of a wear-resistant ferrous alloy different from said cast iron body and including substantial amounts of chromium, said insert being metallurgically joined to said cast iron through a nickel base brazing alloy including small amounts of boron and silicon.

8. A method of forming a cast iron article having imbedded therein an insert of a ferrous metal alloy including substantial amounts of chromium comprising the steps of cleaning the surfaces of said insert, applying a layer of a nickel base alloy including small amounts of boron and silicon over at least portions of said insert, casting molten cast iron against said coating and permitting said cast iron to cool whereby a metallurgical bond is formed between said insert and said cast iron.

References Cited in the file of this patent

UNITED STATES PATENTS

| | | |
|---|---|---|
| 1,961,917 | Smith | June 5, 1934 |
| 2,064,155 | Fahrenwold | Dec. 15, 1936 |
| 2,363,673 | Jensen | Nov. 28, 1944 |
| 2,550,879 | Stevens | May 1, 1951 |
| 2,631,577 | Carter | Mar. 17, 1953 |
| 2,753,859 | Bartlett | July 10, 1956 |